Figure 1:
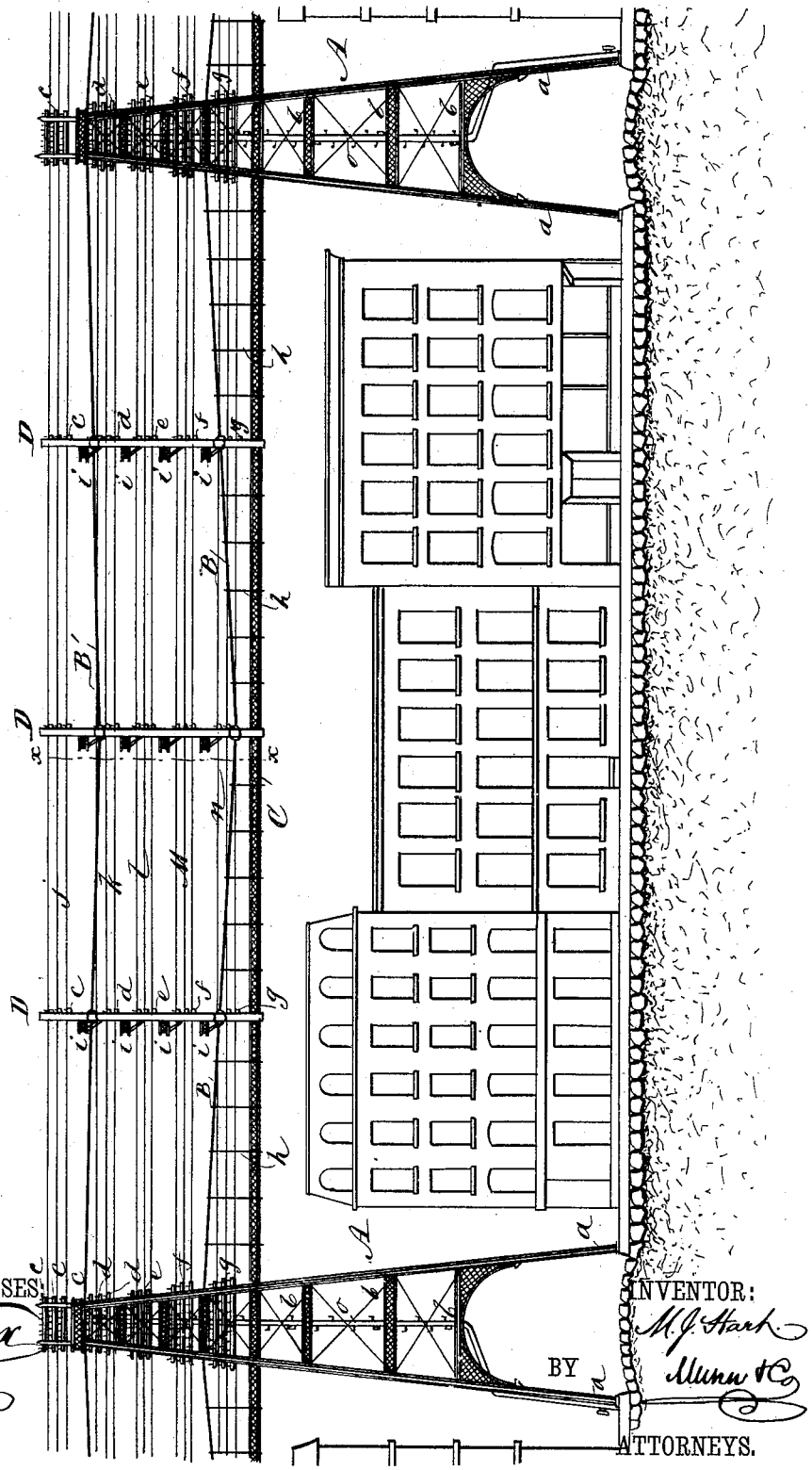

(No Model.) 2 Sheets—Sheet 1.
M. J. HART.
SUPPORT FOR ELECTRIC CONDUCTORS.
No. 377,894. Patented Feb. 14, 1888.

(No Model.) 2 Sheets—Sheet 2.
M. J. HART.
SUPPORT FOR ELECTRIC CONDUCTORS.
No. 377,894. Patented Feb. 14, 1888.
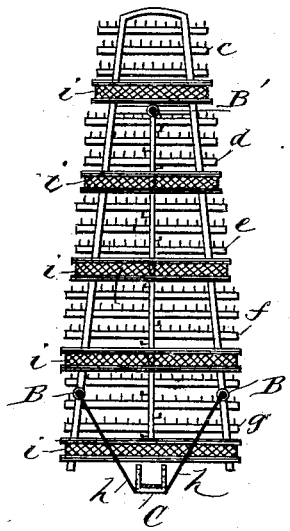
Fig. 2
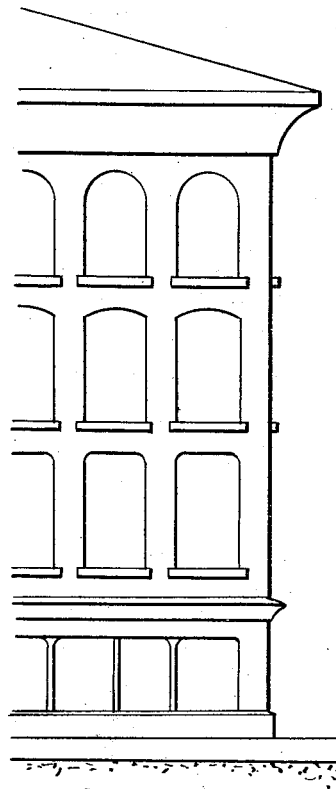
WITNESSES:
C. Neveux
C. Sedgwick
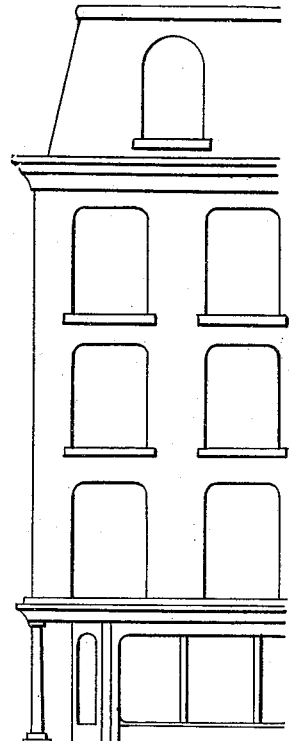
INVENTOR:
M. J. Hart
BY Munn & Co
ATTORNEYS.

UNITED STATES PATENT OFFICE.

MAURICE J. HART, OF NEW ORLEANS, LOUISIANA.

SUPPORT FOR ELECTRIC CONDUCTORS.

SPECIFICATION forming part of Letters Patent No. 377,894, dated February 14, 1888.

Application filed December 6, 1887. Serial No. 257,101. (No model.)

*To all whom it may concern:*

Be it known that I, MAURICE J. HART, of New Orleans, in the parish of Orleans and State of Louisiana, have invented a new and Improved Support for Electric Conductors, of which the following is a specification, reference being had to the annexed drawings, forming a part thereof, in which—

Figure 1 is a side elevation of my improved support for electric conductors, and Fig. 2 is a vertical transverse section of the upper portion of the support on the line $x\,x$ in Fig. 1.

Similar letters of reference indicate corresponding parts in both views.

The object of my invention is to construct a support for electric conductors for electric lighting, telegraphic, telephonic, and other purposes, which will sustain the conductors above the general level of the house-tops and will afford facilities for adjusting or repairing the line-conductors.

In its broadest aspect my invention consists of the following parts, viz.: preferably a series of towers erected at the intersection of streets, having cross-bars for supporting conductors, two or more cables supported by said towers, and, preferably, trestles which are provided with supports for conductors and arranged between the towers and supported by the cables.

The invention further consists in combining a foot-bridge with the foregoing parts, it being suspended from the cables by suitable means, all as hereinafter described.

The towers A, which are preferably erected at the intersection of streets, are formed of hollow corner-posts $a$, resting on the curbstone at the corners of streets and provided with floors or landings $b$, which connect the corner-posts and form platforms to be used as fire-escapes. The corner-posts are made convergent, so that the tower tapers from the width of the street at the bottom to a few feet at the top. To the top of each tower are secured bars $c$, for supporting telephone-wires, and below the bars $c$ are arranged series of bars $d\,e\,f\,g$, designed for supporting wires for general telegraphic purposes—city telegraph-wires, fire-alarms, &c., incandescent electric-light conductors, and arc electric-light conductors—each kind of electric conductor being arranged in separate groups, the arc wires being preferably placed at the bottom and the incandescent conductors next above, to remove them as far as possible from the telephone-conductors at the top in order to avoid the effects of induction.

The towers A support a number of wire cables, B B'. In the present case two cables, B, are attached to the towers in the same level and the cable B' is suspended from a higher point. From the lower cables, B, is suspended a footway, C, by suspenders $h$, the footway being formed of trestle-work and planking, according to any of the well-known plans.

To the cables B B B' are secured trestles D, which carry cross-bars $c\,d\,e\,f\,g$, corresponding with the bars on the towers, and below the bars $c\,d\,e\,f\,g$ are arranged platforms $i$, for supporting the line-men or inspector. Telephone-wires $j$, telegraph-wires $k\,l$, incandescent electric-light wires M, and arc electric-light wires $n$ are supported by the bars $c\,d\,e\,f\,g$, preferably in the order named, beginning with the telephone-wires, which are at the top. Each tower A is provided with a ladder, $o$, by which ascent and descent may be made by the linemen or inspector.

Although the towers A are preferably placed at the intersection of streets, they may be placed at intermediate points, or they may be arranged several blocks apart, and as many intermediate trestles D as are necessary may be used.

By means of my improved support for electric conductors the conductors are suspended in a position entirely out of the way of builders and firemen. It avoids obstructing the streets with unsightly poles and does not obscure the light.

Having thus described my invention, I claim as new and desire to secure by Letters Patent—

1. The combination, with a series of towers provided with conductor-supporting cross-bars, of two or more cables supported by the towers and intermediate trestles supported by the cables and provided with conductor-supports, substantially as described.

2. The combination, with a series of towers provided with conductor-supporting cross-bars, of two or more cables supported by the towers, intermediate trestles supported by the cables and provided with conductor-supports, and a foot-bridge suspended from the cables, substantially as described.

3. The combination, in an electric conductor-support, of towers A, having hollow columns $a$ and platforms $b$, series of cross-bars $c\ d\ e\ f\ g$, adapted to support the electric conductors, cables B B B', trestles D, supported by the cables and provided with the cross-bars $c\ d\ e\ f\ g$ and platforms $i$, and the bridge C and suspenders $h$, substantially as described.

MAURICE J. HART.

Witnesses:
A. S. PERKINS,
T. WHARTON COLLENS.